United States Patent
Junqua et al.

(10) Patent No.: US 6,684,185 B1
(45) Date of Patent: *Jan. 27, 2004

(54) SMALL FOOTPRINT LANGUAGE AND VOCABULARY INDEPENDENT WORD RECOGNIZER USING REGISTRATION BY WORD SPELLING

(75) Inventors: Jean-Claude Junqua, Santa Barbara, CA (US); Ted Applebaum, Santa Barbara, CA (US); Roland Kuhn, Santa Barbara, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/148,579

(22) Filed: Sep. 4, 1998

(51) Int. Cl.[7] .......................... G10L 15/06; G10L 15/04
(52) U.S. Cl. ..................... 704/243; 704/254; 704/251
(58) Field of Search ........................ 704/243, 244, 704/251, 254, 255, 241, 235

(56) References Cited

U.S. PATENT DOCUMENTS

| | | | | |
|---|---|---|---|---|
| 5,500,920 A | * | 3/1996 | Kupiec | 704/270 |
| 5,502,790 A | * | 3/1996 | Yi | 704/256 |
| 5,737,723 A | * | 4/1998 | Riley et al. | 704/243 |
| 5,822,728 A | * | 10/1998 | Applebaum et al. | 704/254 |
| 5,983,177 A | * | 11/1999 | Wu et al. | 704/244 |
| 6,108,627 A | * | 8/2000 | Sabourin | |

OTHER PUBLICATIONS

Anderson et al, "Comparison of two tree–structured approaches for grapheme–to–phoneme conversion," ICSLP 96, Proc. Fourth International Conf. Spoken Language, vol. 3, pp. 1700–1703.*

Asadi et al, "Automatic modeling for adding new words to a large vocabulry continuous speech recognition system", 1991, ICASSP–91, vol. 1, pp. 305–308.*

* cited by examiner

Primary Examiner—Richemond Dorvil
Assistant Examiner—Angela Armstrong
(74) Attorney, Agent, or Firm—Harness, Dickey & Pierce, PLC

(57) ABSTRACT

A phoneticizer converts spelled words or names into one or an n-best number of phonetic transcriptions. The n-best transcriptions may be generated from a single transcription using a confusion matrix. These n-best transcriptions are then transformed into hybrid units. Preferably only the most frequently encountered units are stored as syllables, with the remainder being stored as smaller units such as demi-syllables or phonemes. Voice input is then used to rescore the n-best transcriptions and these are stored preferably as speaker-independent, similarity-based hybrid units concatenated into a string representing the spelled word.

26 Claims, 4 Drawing Sheets

Step 1

Put syllable boundaries around each stress-bearing phoneme

Step 2

Put all intervocalic velar nasals into codas

Step 3

Put all intervocalic 's' and 'sh' into onsets

Step 4

Put all unsyllabified 's' and 'sh' that immediately follow stressed vowels into codas

Step 5

Optimize onsets with remaining intervocalic non-syllabified material

Step 6

Expand the onset of the first syllable of the word to the beginning of the word and the coda of the last syllable of the word to the end of the word

FIG. 2

SMALL FOOTPRINT LANGUAGE AND VOCABULARY INDEPENDENT WORD RECOGNIZER USING REGISTRATION BY WORD SPELLING

BACKGROUND AND SUMMARY OF THE INVENTION

The present invention relates generally to speech recognizers. More particularly, the invention relates to a small memory footprint recognizer suitable for embedded applications where available memory and processor resources are limited. New words are added to the recognizer lexicon by entry as spelled words that are then converted into phonetic transcriptions and subsequently into syllabic transcriptions for storage in the lexicon.

The trend in consumer products today is to incorporate speech technology to make these products easier to use. Many consumer products, such as cellular telephones, offer ideal opportunities to exploit speech technology, however they also present a challenge in that memory and processing power is often limited. Considering the particular case of using speech recognition technology for voice dialing of cellular telephones, the embedded recognizer will need to fit into a relatively small amount of non-volatile memory, and the random access memory used by the recognizer in operation is also fairly limited.

To economize memory usage, the typical embedded recognizer system will have a very limited, often static, vocabulary. The more flexible large vocabulary recognizers that employ a phonetic approach combined with statistical techniques, such as Hidden Markov Model (HMM), use far too much memory for many embedded system applications. Moreover, the more powerful, general purpose recognizers model words on subword units, such as phonemes that are concatenated to define the words models. Frequently these models are context-dependent. They store different versions of each phoneme according to what neighboring phonemes precede and follow (typically stored as triphones). For most embedded applications there are simply too many triphones to be stored in a small amount of memory.

Related to the memory constraint issue, many embedded systems have difficulty accommodating a user who wishes to add new words to the lexicon of recognized words. Not only is lexicon storage space limited, but the temporary storage space needed to perform the word addition process is also limited. Moreover, in embedded systems, such as the cellular telephone, where the processor needs to handle other tasks, conventional lexicon updating procedures may not be possible within a reasonable length of time. User interaction features common to conventional recognizer technology are also restricted. For example, in a conventional recognizer system, a guidance prompt is typically employed to confirm that a word uttered by the user was correctly recognized. In conventional systems the guidance prompt may be an encoded version of the users recorded speech. In some highly constrained embedded systems, such guidance prompts may not be practical because the encoded version of the recorded speech (guidance voice) requires too much memory.

The present invention addresses the above problems by providing a small memory footprint recognizer that may be trained quickly and without large memory consumption by entry of new words through spelling. The user enters characters, such as through a keyboard or a touch-tone pad of a telephone, and these characters are processed by a phoneticizer that uses decision trees or the like to generate a phonetic transcription of the spelled word. If desired, multiple transcriptions can be generated by the phoneticizer, yielding the n-best transcriptions. Where memory is highly constrained, the n-best transcriptions can be generated using a confusion matrix that calculates the n-best transcriptions based on the one transcription produced by the phoneticizer. These transcriptions are then converted into another form based on hybrid sound units described next.

The system employs a hybrid sound unit for representing words in the lexicon. The transcriptions produced by the phoneticizer are converted into these hybrid sound units for compact storage in the lexicon. The hybrid units can comprise a mixture of several different sound units, including syllables, demi-sylables, phonemes and the like. Preferably the hybrid units are selected so that the class of larger sound units (e.g., syllables) represent the most frequently used sounds in the lexicon, and so that one or more classes of smaller sound units (e.g. demi-syllables and phonemes) represent the less frequently used sounds. Such a mixture gives high recognition quality associated with larger sound units without the large memory requirement. Co-articulated sounds are handled better by the larger sound units, for example.

Using a dictionary of hybrid sound units, the transcriptions produced by phonetic transcription are converted to yield the n-best hybrid unit transcriptions. If desired, the transcriptions can be rescored at this stage, using decision trees or the like. Alternatively, the best transcription (or set of n-best transcriptions) is extracted through user interaction or by comparison to the voice input supplied by the user (e.g., through the microphone of a cellular telephone).

A word template is then constructed from the extracted best or n-best transcriptions, by selecting previously stored hybrid units from the hybrid unit dictionary and these units are concatenated to form a hybrid unit string representing the word. Preferably the hybrid units are represented using a suitable speaker-independent representation; a phone similarity representation is presently preferred although other representations can be used. The spelled word (letters) and the hybrid unit string (concatenated hybrid units) are stored in the lexicon as a new entry. If desired, the stored spelled word can be used as a guidance prompt by displaying it on the LCD display of the consumer product.

The recognizer of the invention is highly memory efficient. In contrast with the large lexicon of HMM parameters found in conventional systems, the lexicon of the invention is quite compact. Only a few bytes are needed to store the spelled word letters and the associated hybrid unit string. Being based on hybrid units the word model representation is highly compact and the hybrid unit dictionary used in word template construction is also significantly smaller than dictionaries found in conventional systems.

For a more complete understanding of the invention, its objects and advantages, referred to the following specification and to the accompanying drawings.

BRIEF DESCRIPTION OF THE DRAWINGS

FIG. 2 is a flow chart diagram illustrating a presently preferred syllabification process;

DETAILED DESCRIPTION OF THE PREFERRED EMBODIMENTS

Figure 1:
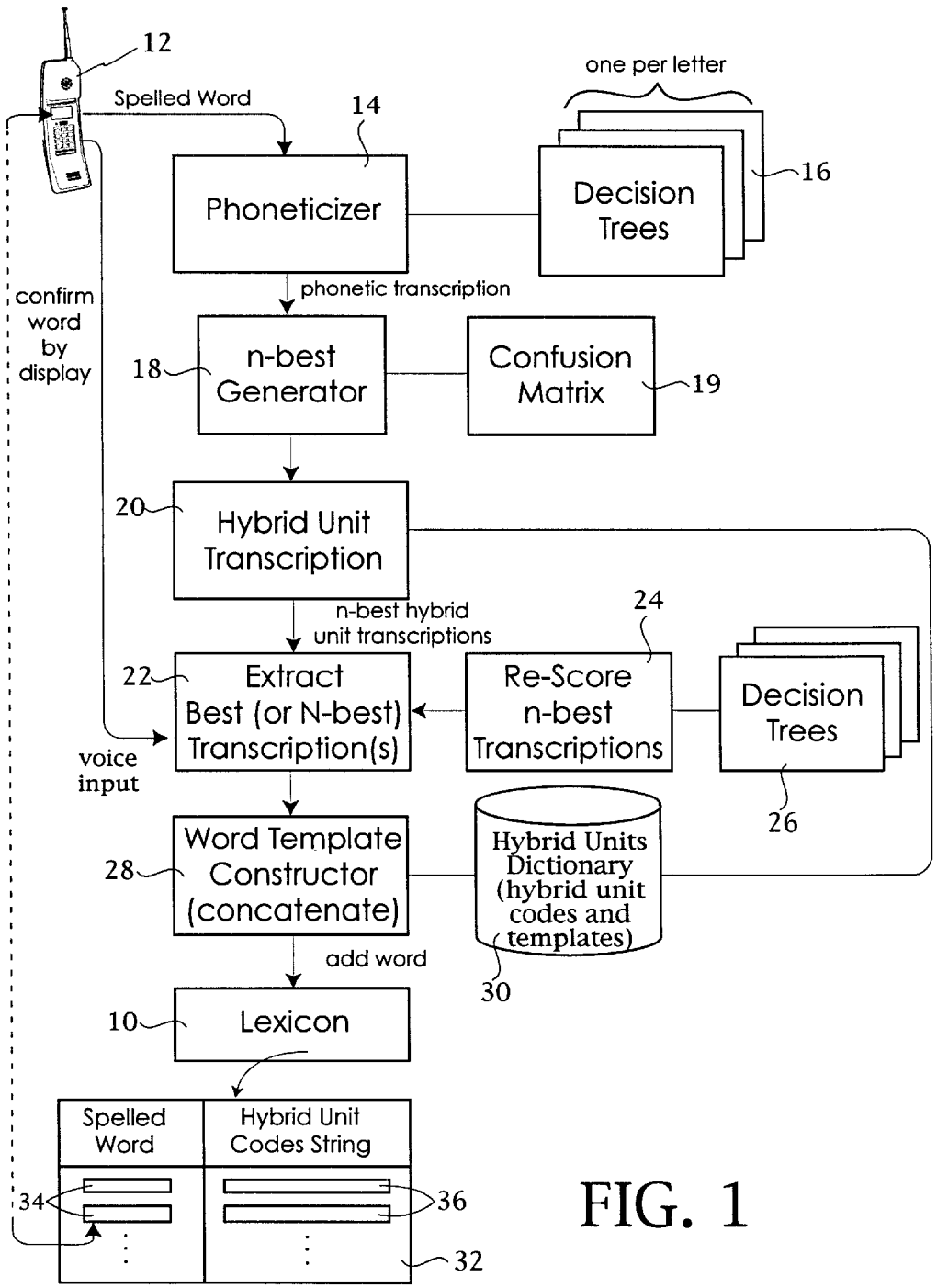
FIG. 1 is a block diagram of one embodiment of the recognizer in accordance with the invention.

Referring to FIG. 1, the speech recognizer of the invention will be described in the context of a typical consumer product application, in this case a cellular telephone application. It will, of course, be appreciated that the principles of the invention can be applied in a variety of different applications and are therefore not limited to the cellular telephone application illustrated here.

The recognizer system stores entries for all words that it can recognize in a lexicon. Unlike conventional recognizers, however, this system represents each word as a string of concatenated hybrid units. In the case of the cellular telephone application some of the words in the lexicon may represent the names of parties to whom telephone numbers have been assigned by the user. Thus the user can speak the name of the party into the cellular telephone device 12 and the system will then recognize the spoken name and look up the associated telephone number so that the call can be placed.

In order to better understand how the recognizer of the invention represents entries in its lexicon, a description of the presently preferred word registration system will now be presented. The word registration system is the mechanism by which new words are added to the lexicon through word spelling entry.

To add a new word to the lexicon, the user spells the word, the spelled letters representing the new word input. Any suitable means can be used to input the letters of the spelled word. Hardware devices such as keyboards or touch-tone keypads may be used. Voice recognition can also be used, where the recognizer, itself converts the spoken letters into alphanumeric characters.

The spelled word entered by the user is processed by phoneticizer 14. Phoneticizer 14 converts the spelled word letters into one or more phonetic transcriptions. The presently preferred embodiment uses decision trees to perform the letter to phoneme conversion. The presently preferred phoneticizer uses one decision tree per letter of the alphabet; each decision tree yields the probability that a given letter will have a given phonetic transcription, based on information about neighboring letters. A more complete description of the presently preferred decision tree-based phoneticizer appears later in this document. While decision tree technology is presently preferred, other algorithmic or heuristic techniques may also be used.

Phoneticizer 14 generates at least one phonetic transcription, and optionally multiple phonetic transcriptions for the spelled word entry. The phoneticizer attaches a probability value or score to each letter to phoneme conversion, and these data may be used to rank the phonetic transcriptions in the order of the n-best, where n is an integer value. In one embodiment, phoneticizer 14 generates the n-best transcriptions and outputs this as a list to hybrid unit transcription module 20. In an alternate embodiment phoneticizer 14 generates a single phonetic transcription (e.g., the best transcription) and this transcription is then processed by an n-best transcription generator 18 that uses a confusion matrix 19 to generate a list of n-best phonetic transcriptions based on the single transcription provided by the phoneticizer. The confusion matrix consists of a prestored look-up table of frequently confused phonetic sounds. The generator 18 uses the confusion matrix to create multiple permutations of the original phonetic transcription by substituting sounds obtained from the confusion matrix.

The hybrid unit transcription module 20 processes the n-best phonetic transcriptions, converting these into hybrid unit transcriptions. The presently preferred embodiment performs the phonetic-to-hybrid unit translation by first using the syllabafication procedure illustrated in FIG. 2. The syllabification procedure results in a list of the n-best syllabic transcriptions. The system consults dictionary 30 to determine whether each syllable in the syllabic transcription is found in the dictionary. If so, a stored code representing that syllable is substituted for the syllable. If not found, the syllable is further decomposed into its constituent sub-unit parts (e.g., demi-syllable or phonemes) and codes are selected from dictionary 30 to represent these parts. Thus the word is ultimately represented as hybrid units (a mixture of syllables, demi-syllables, phonemes, or other suitable sound units). These hybrid units are each represented as codes looked up in dictionary 30. This storage technique saves considerable space in the lexicon, while providing smooth transcriptions with good handling of co-articulated sounds for robust speech recognition.

To further illustrate, a syllable may comprise one or more phonetic sounds. Thus the syllabic transcription is a more macroscopic representation than the phonetic transcription. If syllables alone were used to represent words, a comparatively large lexicon would result. It may take, for example, 1000 or more syllables to represent the majority of words in the English language. The small footprint embodiment of the invention avoids the large lexicon by representing words as hybrid units in which only the most frequently used syllables are retained; the less frequently used syllables are broken into smaller units, such as demi-syllables or phonemes and these smaller units are used in place of those syllables. This provides a natural data compression which contributes to the inventions ability to use memory efficiently.

From the n-best hybrid unit transcriptions, the best transcription or n-best transcriptions are selected by module 22. One technique for extracting the best transcription at 22 is to use the user's voice input. The user simply speaks the name into the device 12 and module 22 matches the spoken input to the n-best transcriptions obtained via module 20 to select one or the n-best transcriptions. One advantage of this extraction technique is that the recognizer system inherently codes for that users voice. In effect, this results in a highly economical speaker adaptation in which entries placed in the lexicon are tuned to the user's voice.

As an alternate to extraction by voice input, module 22 can be configured to work in conjunction with a rescoring mechanism 24 that assigns new probability scores to each transcription based on rules regarding phonetic information. Although not required, the rescoring mechanism can improve performance and represents a desirable addition if memory and processor resources are available. The presently preferred rescoring mechanism uses decision trees 26, which may be mixed decision trees comprising questions based on letters and questions based on phonemes. The description of decision tree phoneticizers provided below explains one embodiment of such a mixed decision tree mechanism for rescoring.

With the best transcription or n-best transcriptions having been selected, word template constructor 28 then builds a highly compact representation of the word by using the dictionary 30. The dictionary represents hybrid units as units that may be used by the pattern matching algorithm of the desired recognizer. Similarity-based units, such as units based on phone similarity are presently preferred because they can be rendered speaker-independent and because they are memory efficient. Hidden Markov Models can also be used to represent the hybrid units, although such representation involves greater complexity.

Phone similarity representations of the hybrid units can be constructed in advance, using a suitable phoneme dictionary against which the hybrid units are compared to compute phone similarity. To make the system speaker-independent, the database may include many examples of each hybrid unit which are each compared with the phoneme dictionary to compute the similarity for each unit. The examples may be provided as training data. The results are then warped together, using suitable dynamic time warping (DTW) algorithm, resulting in an "average" phone similarity representation for each hybrid unit. These average phone similarity parameters or representations are then stored in dictionary 30. While phone similarity-based representation is presently preferred for its robustness and economy, other representations may be used, including representations ranging from complex speaker-independent Hidden Markov Models to simple, less speaker-independent Linear Predictive Coding.

The word template constructor builds a concatenated string of phone similarity units corresponding to the hybrid units contained in the extracted transcription. This string is then stored in association with the spelled word in the lexicon, as illustrated diagrammatically by data structure 32. Data structure 32 contains spelled word entries 34 in association with strings 36. The data structure may also store other information, such as associated telephone numbers of parties represented by the spelled words (names).

Storing the spelled words 34 gives the system the ability to display the recognized word on the LCD display of the device 12. This provides a user friendly inexpensive feedback to assure the user that the system properly recognized his or her spoken entry.

Referring next to FIG. 2, the presently preferred procedure for performing syllabification is illustrated in steps 1–6. The reader may want to consult the examples reproduced below when reviewing the flowchart of FIG. 2. The examples illustrate different word entries and show what the syllabification algorithm does in each of the six numbered steps. Line numbers in the examples correspond to step numbers in FIG. 2. In the examples, angled brackets < >are used to denote syllable boundaries and the percent symbol % is used to denote word boundaries. Numbers appearing after the phonemes correspond to the degree of stress applied to that phoneme. The presently preferred phoneticizer 14 generates phonetic output at three stress levels, 0, 1 and 2.

Referring to FIG. 2, syllable boundaries are placed around each stress-bearing phoneme in step 1. Thus there will be a syllable for each phoneme with a number following it to indicate the stress level. Next, all intervocalic velar nasals ("ng") are placed into codas. Coda refers to that portion of the syllable following the sonority peak of the syllable—usually a vowel—called the nucleus. The velar nasal "ng" can only occur in codas in English. Referring to line 2 in the first example, note that the letters "ng" have been moved inside the angled brackets at the coda position, that is at the position following the nucleus.

Next, in step 3, all intervocalic "s" and "sh" phonemes are placed into the corresponding onset positions. Onset refers to that portion of the syllable preceding the nucleus. See for example line 3 in the second example presented below. In step 4 all unsyllabified "s" and "sh" phonemes that immediately follow stressed vowels are placed into codas.

Step 5 then proceeds by optimizing the onsets with the remaining intervocalic non-syllabified material. All of the remaining intervocalic non-syllabified phonemes are tested to see if they can form an onset. This is done by comparing them with a list of possible onsets. If they can be made part of an onset, they are so placed at this time. If they cannot form part of an onset, then the procedure removes one phoneme from the beginning of the string until what remains can form a possible onset. The onset is established at that point and brings the end of the coda of the preceding syllable up to it.

Finally, in step 6, the onset of the first syllable of the word is expanded to the beginning of the word, and the coda of the last syllable of the word is expanded to the end of the word. Steps 5 and 6 will affect most words, whereas steps 1–4 affect only a limited subset. The following examples will now further illustrate.

EXAMPLES

Velar nasal put into coda in step 2.
~bellingham #NAME;
bcl b eh1 l ih0 ng ax0 m
1%bcl b <eh1> l <ih0> ng <ax0> m%
2%bcl b <eh1> l <ih0 ng> <ax0> m%
3%bcl b <eh1> l <ih0 ng> <ax0> m%
4%bcl b <eh1> l <ih0 ng> <ax0> m%
5%bcl b <eh1> <l ih0 ng> <ax0> m%
6%<bcl b eh1> <l ih0 ng> <ax0> m%
Intervocalic "s" put into onset in step 3.
~absences #
ae1 bcl b s en0 s ih0 z
1%<ae1> bcl b s <en0> s< ih0> z%
2%<ae1> bcl b s <en0> s< ih0> z%
3%<ae1> bcl b s <en0> <s ih0> z%
4%<ae1> bcl b s <en0> <s ih0> z%
5%<ae1 bcl b> <s en0> <s ih0> z%
Intervocalic "sh" put into onset in step 3.
~abolitionist #
ae2 bcl b ax0 l ih1 sh ih0 n ih0 s tcl t
1%<ae2> bcl b <ax0> l< ih1> sh <ih0> n <ih0> s tcl t%
2%<ae2> bcl b <ax0> l< ih1> sh <ih0> n <ih0> s tcl t%
3%<ae2> bcl b <ax0> l< ih1> <sh ih0> n <ih0> s tcl t%
4%<ae2> bcl b <ax0> l< ih1> <sh ih0> n <ih0> s tcl t%
5%<ae2> <bcl b ax0> <l ih1> <sh ih0> <n ih0> s tcl t%
6%<ae2> <bcl b ax0> <l ih1> <sh ih0> <n ih0 s tcl t>%
Unsyllabified "s" put into coda after stressed vowel in step 4.
~abasement #
ax0 bcl b ey1 s m ih0 n tcl t
1%<ax0> bcl b <ey1> s m <ih0> n tcl t%
2%<ax0> bcl b <ey1> s m <ih0> n tcl t%
3%<ax0> bcl b <ey1> s m <ih0> n tcl t%
4%<ax0> bcl b <ey1 s> m <ih0> n tcl t%
5%<ax0> <bcl b ey1 s> <m ih0> n tcl t%
6%<ax0> <bcl b ey1 s> <m ih0 n tcl t>%
Unsyllabified "sh" put into coda after stressed vowel in step 4.
~cochrane #/NAME;
kcl k >ow1< sh r <ey2> n%
1%kcl k <ow1> sh r <ey2> n%
2%kcl k <ow1> sh r <ey2> n%

3%kcl k <ow1> sh r <ey2> n%
4%kcl k <ow1 sh> <r ey2> n%
5%kcl k <ow1 sh> <r ey2> n%
6%<kcl k ow1 sh> <r ey2 n>%

The Decision Tree Phoneticizer

The presently preferred phoneticizer is a pronunciation generator which employs two stages. The first stage employs a set of letter-only decision trees 110 and the second stage employs a set of mixed-decision trees 112. An input sequence 114, such as the sequence of letters B-l-B-L-E, is fed to a dynamic programming phoneme sequence generator 116. The sequence generator uses the letter-only trees 110 to generate a list of pronunciations 118, representing possible pronunciation candidates of the spelled word input sequence.

The sequence generator sequentially examines each letter in the sequence, applying the decision tree associated with that letter to select a phoneme pronunciation for that letter based on probability data contained in the letter-only tree.

Figure 3:
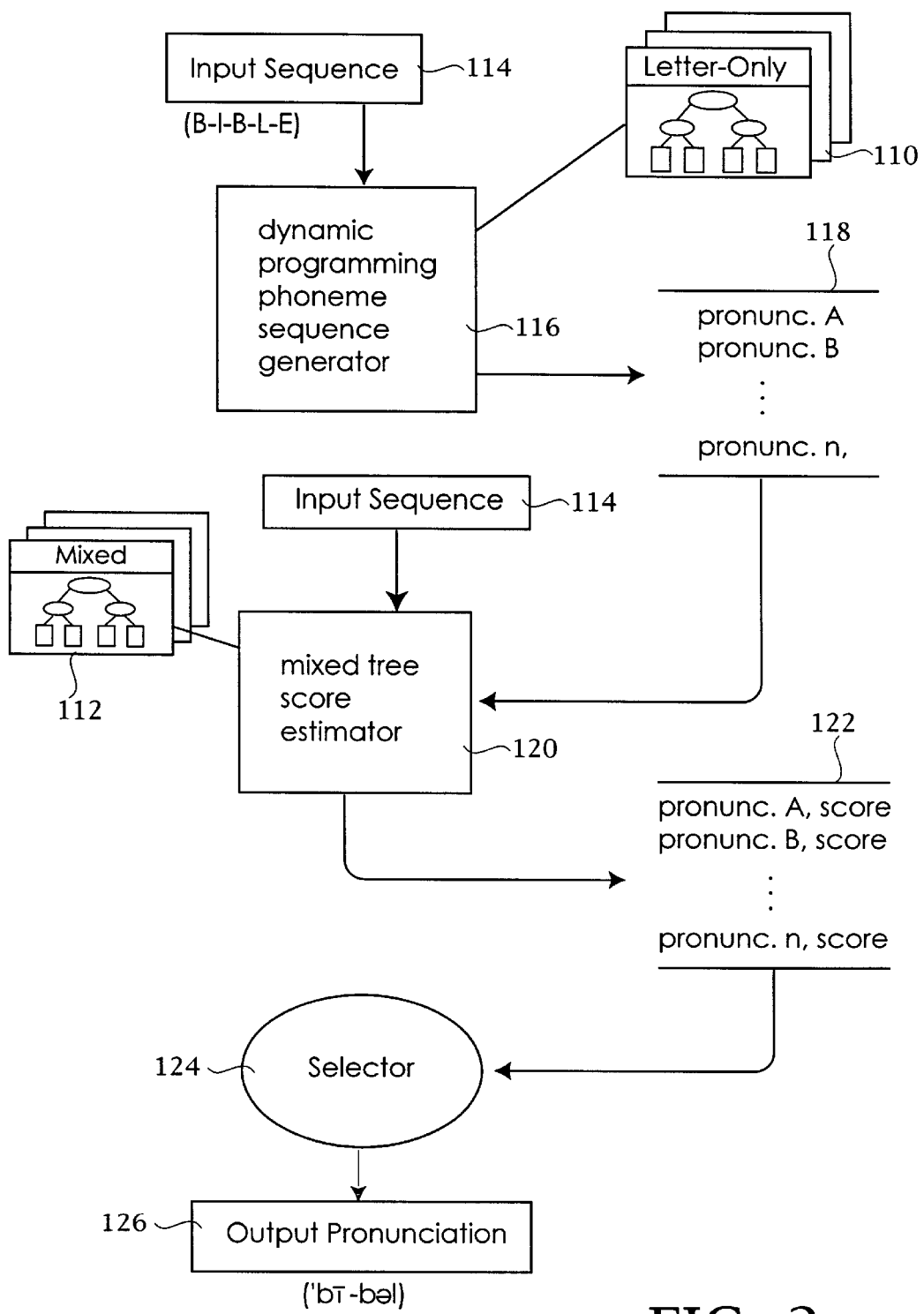
FIG. 3 is a block diagram illustrating the presently preferred phoneticizer using decision trees.
Figure 4:
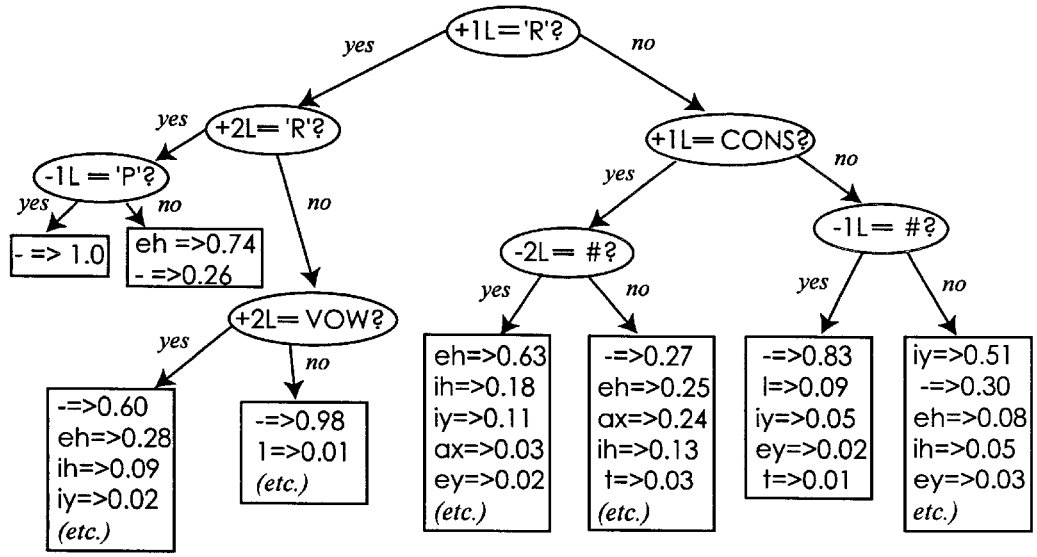
FIG. 4 is a tree diagram illustrating a letter-only tree.

Preferably the set of letter-only decision trees includes a decision tree for each letter in the alphabet. FIG. 4 shows an example of a letter-only decision tree for the letter E. The decision tree comprises a plurality of internal nodes (illustrated as ovals in the Figure) and a plurality of leaf nodes (illustrated as rectangles in the Figure). Each internal node is populated with a yes-no question. Yes-no questions are questions that can be answered either yes or no. In the letter-only tree these questions are directed to the given letter (in this case the letter E) and its neighboring letters in the input sequence. Note in FIG. 3 that each internal node branches either left or right depending on whether the answer to the associated question is yes or no.

Abbreviations are used in FIG. 4 as follows: numbers in questions, such as "+1" or "−1" refer to positions in the spelling relative to the current letter. For example, "+1L=='R'?" means "Is the letter after the current letter (which in this case is the letter E) an R?" The abbreviations CONS and VOW represent classes of letters, namely consonants and vowels. The absence of a neighboring letter, or null letter, is represented by the symbol −, which is used as a filler or placeholder where aligning certain letters with corresponding phoneme pronunciations. The symbol # denotes a word boundary.

The leaf nodes are populated with probability data that associate possible phoneme pronunciations with numeric values representing the probability that the particular phoneme represents the correct pronunciation of the given letter. For example, the notation "iy=>0.51" means "the probability of phoneme 'iy' in this leaf is 0.51." The null phoneme, i.e., silence, is represented by the symbol '−'.

The sequence generator 116 (FIG. 3) thus uses the letter-only decision trees 110 to construct one or more pronunciation hypotheses that are stored in list 118. Preferably each pronunciation has associated with it a numerical score arrived at by combining the probability scores of the individual phonemes selected using the decision tree 110. Word pronunciations may be scored by constructing a matrix of possible combinations and then using dynamic programming to select the n-best candidates. Alternatively, the n-best candidates may be selected using a substitution technique that first identifies the most probable word candidate and then generates additional candidates through iterative substitution, as follows.

The pronunciation with the highest probability score is selected first, by multiplying the respective scores of the highest-scoring phonemes (identified by examining the leaf nodes) and then using this selection as the most probable candidate or first-best word candidate. Additional (n-best) candidates are then selected by examining the phoneme data in the leaf nodes again to identify the phoneme, not previously selected, that has the smallest difference from an initially selected phoneme. This minimally-different phoneme is then substituted for the initially selected one to thereby generate the second-best word candidate. The above process may be repeated iteratively until the desired number of n-best candidates have been selected. List 118 may be sorted in descending score order, so that the pronunciation judged the best by the letter-only analysis appears first in the list.

As noted above, a letter-only analysis will frequently produce poor results. This is because the letter-only analysis has no way of determining at each letter what phoneme will be generated by subsequent letters. Thus a letter-only analysis can generate a high scoring pronunciation that actually would not occur in natural speech. For example, the proper name, Achilles, would likely result in a pronunciation that phoneticizes both ll's: ah-k-ih-l-l-iy-z. In natural speech, the second l is actually silent: ah-k-ih-l-iy-z. The sequence generator using letter-only trees has no mechanism to screen out word pronunciations that would never occur in natural speech.

The second stage of the pronunciation system addresses the above problem. A mixed-tree score estimator 120 uses the set of mixed-decision trees 112 to assess the viability of each pronunciation in list 118. The score estimator works by sequentially examining each letter in the input sequence along with the phonemes assigned to each letter by sequence generator 116.

Figure 5:
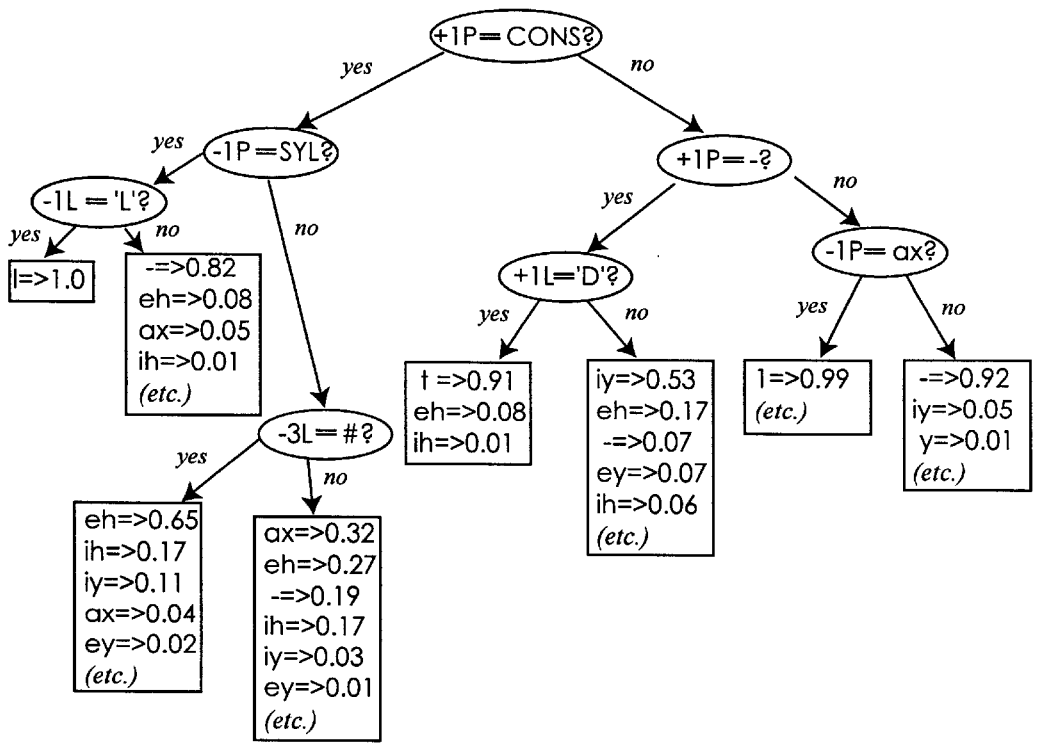
FIG. 5 is a tree diagram illustrating a mixed tree in accordance with the invention.

Like the set of letter-only trees, the set of mixed trees has a mixed tree for each letter of the alphabet. An exemplary mixed tree is shown in FIG. 5. Like the letter-only tree, the mixed tree has internal nodes and leaf nodes. The internal nodes are illustrated as ovals and the leaf nodes as rectangles in FIG. 5. The internal nodes are each populated with a yes-no question and the leaf nodes are each populated with probability data. Although the tree structure of the mixed tree resembles that of the letter-only tree, there is one important difference. The internal nodes of the mixed tree can contain two different classes of questions. An internal node can contain a question about a given letter and its neighboring letters in the sequence, or it can contain a question about the phoneme associated with that letter and neighboring phonemes corresponding to that sequence. The decision tree is thus mixed, in that it contains mixed classes of questions.

The abbreviations used in FIG. 5 are similar to those used in FIG. 4, with some additional abbreviations. The symbol L represents a question about a letter and its neighboring letters. The symbol P represents a question about a phoneme and its neighboring phonemes. For example the question "+1L=='D'?" means "Is the letter in the +1 position a 'D'?" The abbreviations CONS and SYL are phoneme classes, namely consonant and syllabic. For example, the question "+1P==CONS?" means "Is the phoneme in the +1 position a consonant?" The numbers in the leaf nodes give phoneme probabilities as they did in the letter-only trees.

The mixed-tree score estimator rescores each of the pronunciations in list 118 based on the mixed-tree questions and using the probability data in the lead nodes of the mixed trees. If desired, the list of pronunciations may be stored in association with the respective score as in list 122. If desired, list 122 can be sorted in descending order so that the first listed pronunciation is the one with the highest score.

In many instances the pronunciation occupying the highest score position in list 122 will be different from the pronunciation occupying the highest score position in list 118. This occurs because the mixed-tree score estimator, using the mixed trees 112, screens out those pronunciations that do not contain self-consistent phoneme sequences or otherwise represent pronunciations that would not occur in natural speech.

If desired a selector module 124 can access list 122 to retrieve one or more of the pronunciations in the list. Typically selector 124 retrieves the pronunciation with the highest score and provides this as the output pronunciation 126.

A Hybrid Unit Word Recognizer

The similarity-based hybrid unit representation lends itself well to compact speech recognizers, suitable for a variety of consumer applications. Input speech supplied to the recognizer is compared with entries in the lexicon using a pattern matching algorithm. A dynamic time warping (DTW) algorithm may be used for example.

To accommodate possible variation in stress or speed at which syllables within a spelled word may be spoken, the system employs a set of rules to compress or expand the duration of certain hybrid units. The syllables within long spelled words are sometimes pronounced rapidly. This information may be added to the lexicon, for example. The recognizer can then use a priori knowledge about the length of spelled words—obtained by counting the number of letters in the spelled word, for example—to better match spoken input to the proper lexicon entry.

Other techniques for incorporating a priori knowledge of variation in pronunciation include applying weights to the more reliable hybrid unit information in the lexicon. The boundaries of hybrid units may be less reliable than the center frames. The pattern matching algorithm may therefore weight the center frames more heavily than the boundaries, thus emphasizing the most reliable parts of the hybrid units.

What is claimed is:

1. A speech recognizer having a lexicon updatable by spelled work input, comprising:
    a phoneticizer for generating a first phonetic transcription of said spelled word input using probabilistic rules and a second phonetic transcription of said spelled word input using probabilistic rules;
    a hybrid unit generator receptive of said first phonetic transcription and said second phonetic transcription for generating a first hybrid unit representation of said spelled word input and a second hybrid unit representation of said spelled word input;
    a transcription selector that selects one of said first hybrid unit representation and said second hybrid unit representation based on rules regarding phonetic transcription; and
    a word template constructor that generates for said word a sequence of symbols indicative of said selected hybrid unit representation for storing in said lexicon,
    wherein said hybrid unit generator has a dictionary of hybrid units selected to ensure that a class of larger sound units represents sounds in the lexicon that are more frequently used, and to ensure that a class of smaller sound units represent sounds in the lexicon that are less frequently used in comparison to the sounds that are more frequently used.

2. The speech recognizer of claim 1 wherein said phoneticizer includes a set of decision trees that identify different phoneme transcriptions corresponding to letters of an alphabet.

3. The speech recognizer of claim 1 further comprising a multiple phonetic transcription generator that converts first phonetic transcription and said second phonetic transcription into an n-best plurality of phonetic transcriptions.

4. The speech recognizer of claim 1 wherein said phoneticizer generates an n-best plurality of phonetic transcriptions.

5. The speech recognizer of claim 1 wherein said hybrid unit generator generates a plurality of hybrid unit representations of said spelled word.

6. The speech recognizer of claim 5 further comprising scoring processor for applying a score to each of said plurality of hybrid unit representations and for selecting at least one of said plurality of hybrid unit representations to be provided to said word template constructor based on said score.

7. The speech recognizer of claim 6 wherein said scoring processor includes a set of decision trees that apply different scores to different phoneme transcriptions.

8. The speech recognizer of claim 1 wherein said template constructor include a dictionary containing similarity-based representation of said hybrid units.

9. The speech recognizer of claim 1 wherein said phoneticizer includes a memory for storing spelling-to-pronunciation data comprising:
    a decision tree data structure stored in said memory that defines a plurality of internal nodes and a plurality of leaf nodes, said internal nodes adapated for storing yes-no questions and said leaf nodes adapted for storing probability data;
    a first plurality of said internal nodes being populated with letter questions about a given letter and its neighboring letters in said spelled work input;
    a second plurality of said internal nodes being populated with phoneme questions about a phoneme and its neighboring phonemes in said spelled word input;
    said leaf nodes being populated with probability data that associates said given letter with a plurality of phoneme pronunciations.

10. The speech recognizer of claim 1 further wherein said hybrid units are represented as similarity parameters.

11. The speech recognizer of claim 1 wherein said hybrid units are represented as phone similarity parameters based on an average similarity derived from a plurality of training examples.

12. The speech recognizer of claim 1 further comprising hybrid unit duration modification rules for expanding or compressing duration of selected hybrid units based on length of said spelled word.

13. The speech recognizer of claim 1 further comprising pattern matching mechanism for comparing a voiced input to said lexicon, said pattern matching mechanism having weighted mechanism for increasing the importance of selected portions of said hybrid units during pattern matching.

14. The speech recognizer of claim 1, wherein said transcription selector selects one of said first hybrid unit representation and said second hybrid unit representation based on voiced pronunciation by said user of the word corresponding to the spelled word input such that the voiced pronunciation of the word is sufficient to identify said selected hybrid unit representation.

15. The speech recognizer of claim 1, wherein said transcription selector has a rescoring mechanism that assigns new probability scores to said first hybrid unit representation and said second hybrid unit representation based on rules regarding phonetic transcription.

16. The speech recognizer of claim 15, wherein said rescording selector employs mixed decision trees comprising questions based on letters and questions based on phonemes.

17. A speech recognizer having a lexicon user updateable by spelled word input, comprising:

a phoneticizer for generating a first phonetic transcription of said spelled word input using a probabilistic and a second phonetic transcription of said spelled word input using probabilistic rules, and generating stress level indicators for different phonemes;

a hybrid unit generator receptive of said first phonetic transcription and said second phonetic transcription for generating a first hybrid unit representation and a second hybrid unit representation of said spelled word input based on a syllabic transcription of said first phonetic transcription and second phonetic transcription using said stress level indicators;

a transcription selector that selects one of said first hybrid unit representation and said second hybrid unit representation based on rules regarding phonetic transcription; and a word template constructor that generates for said spelled word a sequence of symbols indicative of said selected hybrid unit representation for storing in said lexicon, wherein said hybrid unit generator has a dictionary of hybrid units selected to ensure that a class of larger sound units represent sounds in the lexicon that are more frequently used, and to ensure that a class of smaller sound units represent sounds in the lexicon that are less frequently used in comparison to the sounds that are more frequently used.

18. The speech recognizer of claim 17 wherein said phoneticizer includes a set of decision trees that identify different phoneme transcriptions corresponding to letters of an alphabet.

19. The speech recognizer of claim 17 wherein hybrid unit generator generates a plurality of hybrid unit representations of said spelled word.

20. The speech recognizer of claim 19 further comprising scoring processor for applying a score to each of said plurality of hybrid unit representations and for selecting at least one of said plurality of hybrid unit representations to be provided to said word template constructor based on said score.

21. The speech recognizer of claim 20 wherein said scoring processor includes a set of decision trees that apply different scores to different phoneme transcriptions.

22. The speech recognizer of claim 17 wherein said phoneticizer includes a memory for storing spelling-to-pronunciation data comprising:

a decision tree data structure stored in said memory that defines a plurality of internal nodes and a plurality of leaf nodes, said internal nodes adapted for storing yes-no questions and said leaf nodes adapted for storing probability data;

a first plurality of said internal nodes being populated with letter questions about a given letter and its neighboring letters in said spelled word input;

a second plurality of said internal nodes being populated with phoneme questions about a phoneme and its neighboring phonemes in said spelled word input;

said leaf nodes being populated with probability data that associates said given letter with a plurality of phoneme pronunciations.

23. The speech recognizer of claim 17, wherein said transcription selector selects one of said first hybrid unit representation and said second hybrid unit representation based on voiced pronunciation by said user of the word corresponding to the spelled word input such that the voiced pronunciation of the word is sufficient to identify said selected hybrid unit representation.

24. The speech recognizer of claim 23, wherein said transcription selector has a rescording mechanism that assigns new probability scores to said first hybrid unit representation and said second hybrid unit representation based on rules regarding phonetic transcription.

25. The speech recognizer of claim 24, wherein said rescording selector employs mixed decision trees comprising questions based on letters and questions based on phonemes.

26. A speech recognizer having a lexicon user updateable by spelled word input, comprising:

a phoneticizer for generating a first phonetic transcription of said spelled word input;

a hybrid unit generator receptive of said phonetic transcription for generating at least one hybrid unit representation of said spelled word input based on said phonetic transcription; and a word template constructor that generates for said spelled word a sequence of symbols indicative of said hybrid unit representation for storing in said lexicon, wherein said hybrid unit generator has a dictionary of hybrid units selected to ensure that a class of larger sound units represent sounds in the lexicon that are more frequently used, and to ensure that a class of smaller sound units represent sounds in the lexicon that are less frequently used in comparison to the sounds that are more frequently used.

* * * * *

UNITED STATES PATENT AND TRADEMARK OFFICE
CERTIFICATE OF CORRECTION

PATENT NO. : 6,684,185 B1
DATED : January 27, 2004
INVENTOR(S) : Jean-Claude Junqua et al.

It is certified that error appears in the above-identified patent and that said Letters Patent is hereby corrected as shown below:

Title page,
Item [56], References Cited, OTHER PUBLICATIONS, "Asadi et al.," reference, "vocabulry" should be -- vocabulary --.

Column 10,
Line 25, after "said" insert -- word --.
Line 33, "adapated" should be -- adapted --.
Line 38, "work" should be -- word --.
Line 45, delete "further".
Line 48, "phone" should be -- phoneme --.
Line 58, "weighted" should be -- weighting --.

Column 11,
Line 7, "rescording" should be -- rescoring --.
Line 43, after "wherein" insert -- said --.

Column 12,
Line 27, "rescording" should be -- rescoring --.

Signed and Sealed this

Twenty-sixth Day of October, 2004

JON W. DUDAS
*Director of the United States Patent and Trademark Office*